United States Patent [19]
Nakamoto

[11] Patent Number: 6,009,666
[45] Date of Patent: Jan. 4, 2000

[54] DOOR OPENING AND CLOSING MECHANISM

[75] Inventor: Hiroshi Nakamoto, Neyagawa, Japan

[73] Assignee: Matsushita Electric Industrial Co., Ltd., Japan

[21] Appl. No.: 09/050,036

[22] Filed: Mar. 30, 1998

[30] Foreign Application Priority Data

Mar. 28, 1997 [JP] Japan .................................. 9-077024

[51] Int. Cl.$^7$ ...................................................... E05C 7/06
[52] U.S. Cl. .............................. 49/114; 49/103; 49/364; 49/379
[58] Field of Search ...................... 49/103–105, 109–111, 49/114; 312/291, 276, 327, 328, 314.2, 322, 294, 248; 206/754, 387.1, 387.12, 387.11, 308.1, 373, 751; 242/347.1; 220/255, 259

[56] References Cited

U.S. PATENT DOCUMENTS

| | | | |
|---|---|---|---|
| 2,124,071 | 7/1938 | Loftin ................................. | 206/751 X |
| 5,370,452 | 12/1994 | Baer .................................... | 312/209 X |
| 5,395,064 | 3/1995 | Honsho et al. ...................... | 242/347.1 |
| 5,645,333 | 7/1997 | Sakurai ............................. | 312/319.2 X |

Primary Examiner—Daniel P. Stodola
Assistant Examiner—Hugh B. Thompson
Attorney, Agent, or Firm—Parkhurst & Wendel, LLP

[57] ABSTRACT

A door opening and closing mechanism, wherein a swinging door to cover an opening for loading, unloading, or exchanging discs comprises two doors, an upper door (14) and a lower door (13), each of which is supported by pivots (14a) and (13a). The opening is covered, when closing the doors, with the two doors, the upper door (14) and the lower door (13), by an interlocking motion by engaging a sliding guide (14b) provided on the upper door (14) and a sliding pin (13b) provided on the lower door (13). When opening the doors, the lower door (13) is nested inside the upper door (14) guided by pivots (14a), (13a), the sliding guide (14b), and the sliding pin (13b), whereby the amount of the projection of the doors when open corresponds to the projection only of the upper door (14).

3 Claims, 7 Drawing Sheets

DOOR OPENING AND CLOSING MECHANISM

FIELD OF THE INVENTION

The present invention relates to door opening and closing mechanisms for use in audio equipment and the like which have built-in disc playing apparatus.

BACKGROUND OF THE INVENTION

As shown in FIG. 6, conventional door opening and closing mechanisms are generally structured to have a front panel 2 provided in front of a main unit 1 of an audio device or like equipment, a disc unit panel 3 provided in front of that portion of the front panel 2 behind which a disc playing apparatus is built-in, an opening on that part of the front panel 2 which is in front of the disc playing apparatus for the purpose of loading, unloading or exchanging discs to and from a disc storage unit where a plurality of discs are to be stored, and a mechanism to open and close, as a door, the disc unit panel 3, a transparent window 4, and the like, that might cover the opening. A power button 8 is also provided on the main unit 1.

FIG. 7 is a side cross sectional view of an essential part of an example of a conventional door opening and closing mechanism, in which a pivot 3a is provided to allow a disc unit panel 3 having a window 4 to be opened or closed as a door.

The conventional mechanism comprises a stay 6, a pivot 3b provided on the disc unit panel 3, a stay fixing member 5 provided on the front panel 2, a guide pin 5a, and a guide 6a provided on the stay 6 as an open groove. In accordance with such a mechanism, the disc unit panel 3 opens in engagement with the guide pin 5a and, when open, the disc unit panel 3 is supported by the end portion of the guide 6a and the guide pin 5a on the stay fixing member 5.

However, in a door opening and closing mechanism in which the size of the disc unit panel 3 is about the same as that of the portion of the front panel 2 in front of the disc unit, the amount of projection of the disc unit panel 3 from the front panel 2 becomes large when opened, requiring a holding strength large enough to hold the projected disc unit panel 3 at a certain angle, and further requiring the stay 6 between the disc unit panel 3 and the front panel 2. Also, as the disc unit panel 3 greatly projects forward, free space is required in the front of the main unit 1 thus limiting the place of use or the use of the space in front of the audio equipment.

SUMMARY OF THE INVENTION

An object of this invention is to solve the problems associated with door opening and closing mechanisms of the conventional disc playing apparatus, reduce front panel projection, and provide a door opening and closing mechanism with sufficient strength to hold the door when opening and closing.

To achieve the above objects, the door opening and closing mechanism of the present invention comprises two doors, an upper door and a lower door, which swing to open or close the opening of the disc playing apparatus, two pivots to rotatably support the upper and lower doors, a sliding guide in the form of an open groove provided on the side of the upper door, and a sliding pin which is provided on the side of the lower door and engages with the sliding guide, wherein the lower door is opened or closed interlockingly with the opening and closing operation of the upper door based on the configuration of the sliding guide, and when closing the doors, the opening is covered with the two doors while the lower door is held at a closed position by holding the upper door at a closed position, and when opening, the lower door becomes at least partially nested behind the upper door.

In this way, the projection of the doors from the front panel when the doors are open corresponds only to the projection of the upper door, thus making the amount of overall projection of doors small. It is further possible, in view of the relatively small projection, to secure sufficient holding strength during door opening and closing.

DESCRIPTION OF A PREFERRED EMBODIMENT

Figure 1:
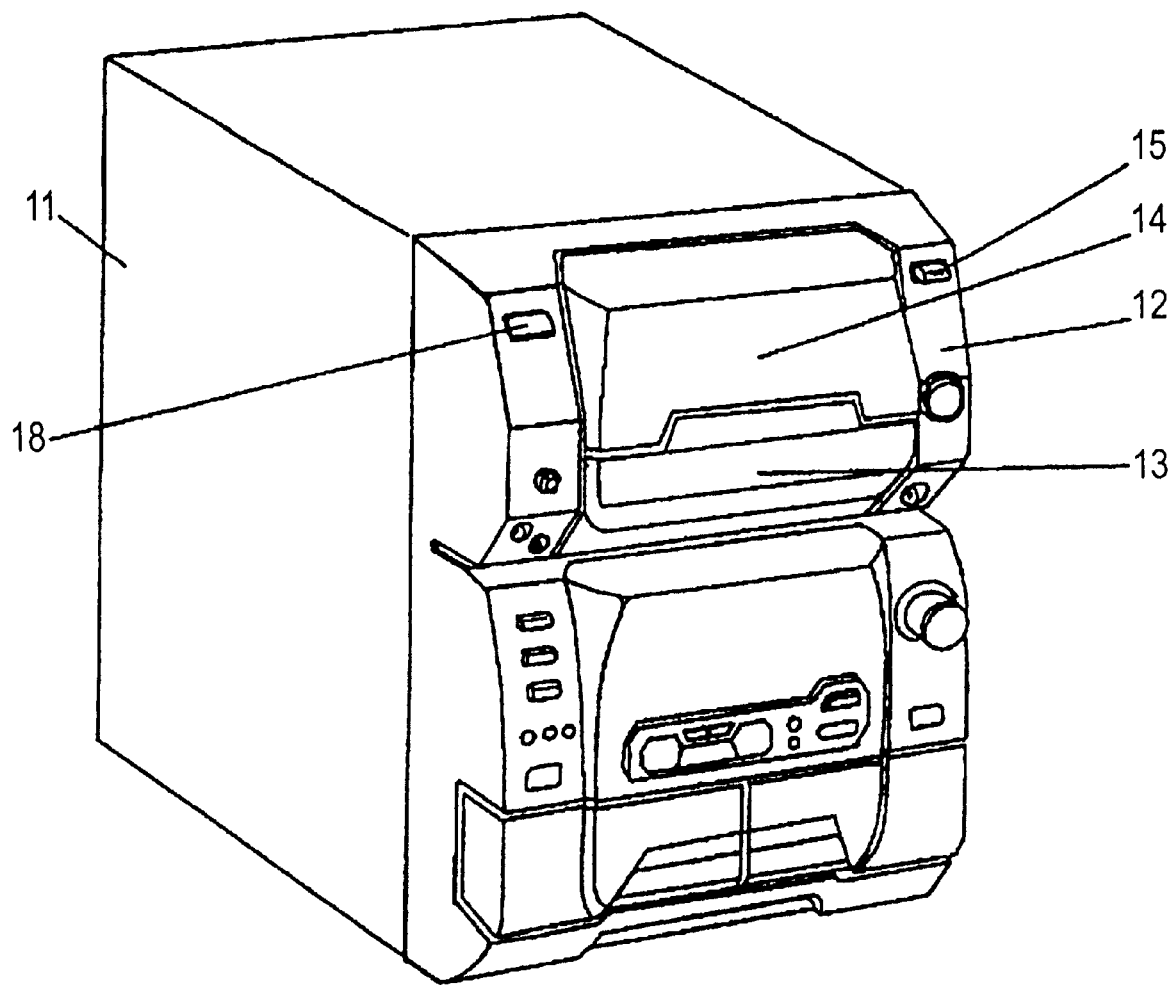
FIG. 1 is a perspective view of audio equipment having a built-in disc playing apparatus with the doors closed in an embodiment of the door opening and closing mechanism of the present invention.

The invention comprises two doors, an upper door and a lower door, which swing to open or close an opening of a disc playing apparatus, two pivots to rotatably support the upper and lower doors, a sliding guide in the form of an open groove provided on the side of the upper door, and a sliding pin which is provided on the side of the lower door and is engaged with the sliding guide, wherein the lower door is opened or closed interlockingly with the opening and closing operation of the upper door based on the configuration of the sliding guide, and when closing the doors, the opening is covered with the two doors while the lower door is being held at a closed position by holding the upper door at a closed position, and when opening, the lower door becomes partially nested on the inside of the upper door. As a result, the projection of doors from the front panel of the audio equipment when the doors are open is only that due to the upper door, thereby minimizing the total amount of door projection and virtually eliminating the need for free space in front of the equipment when the doors are open. Furthermore, since the amount of overall door projection is small, it is possible, without using any additional components, to secure enough strength to hold the doors in an open position.

According to one aspect of the invention, there is provided a structure in which a sliding guide regulates the swing of the lower door toward opening when the upper door is at the closed position, and toward closing when the upper door is at the open position, whereby the lower door is held during opening and closing by the upper door only without using any additional components.

According to another aspect of the invention, there is provided a structure in which the predetermined length of one end of the sliding guide is formed along an arc having its center on the pivot of the upper door and having a radius equal to the distance between the pivot and the sliding pin so that the lower door will not swing in the early stage of opening of the upper door. Thus, by allowing the upper door to swing first when opening the doors, it is possible to easily allow the lower door to enter inside, or become nested within, the upper door without collision or other interference between the two doors.

Referring to the drawings, an embodiment of the present invention is described in detail below.

FIGS. 1 to 5 show a main unit 11 of an audio device or the like, in front of which is provided a front panel 12. A disc playing apparatus is provided in the main unit 11 which apparatus includes a disc stocker 16 to store a plurality of discs 19. On that part of the front panel 12 in front of the disc stocker 16 is provided an opening for loading, unloading and/or exchanging of discs 19. A power button 18 is also provided on the main unit 11.

A lower door 13 that covers part of the opening is rotatably supported by a pivot 13a which is the center of swing of the door from a closed position to an open position, and the opening and closing operation is performed by a sliding pin 13b provided on the lower door 13 which pin is driven by an upper door 14. For example, in FIG. 3, the swing of the lower door 13 is held at the closed position by the sliding pin 13b which is held by the upper door 14 which is in the closed position. Furthermore, by employing a structure in which a portion of the lower door 13 hits a stopping rib 12b provided on the front panel 12 when closing, a stricter regulation of the closing position is assured.

The upper door 14 that also covers the opening is rotatably supported by a pivot 14a which is the center of swing of the door from the closed position to the open position, and is provided on the side with a sliding guide 14b which acts as a guiding groove for the sliding pin 13b in such a way that the sliding pin 13b of the lower door 13 can engage with the sliding guide 14b and slide within the groove of the sliding guide 14b depending on the swing position of the upper door. The mechanism is further structured in such a way that, with the opening swing of the upper door 14, the groove curve of the sliding guide 14b engagingly guides the sliding pin 13b of the lower door 13, and, as the upper door 14 opens, the lower door 13 becomes nested inside the upper door 14. That is, the doors 13, 14 open one on top of the other. Furthermore, the open position of the upper door 14 is regulated by a portion of the upper door 14 hitting an opening stop 12c provided on the front panel 12.

A door hook 20 to hold the doors in a closed state is rotatably held on the main unit 11 by a pivot 20c, has an acting section 20a and a hooking section 20b both of which may be activated by the door opening operation, and keeps the upper door 14 in a closed state by means of the hooking section 20b and a door hook 14d provided on the upper door 14. Incidentally, a detecting element 17 and operating rib 14c are provided to detect if the doors are open or closed.

The sliding guide 14b is configured to allow the lower door 13 to swing interlockingly with the swing of the upper door 14 by guiding the swing of the sliding pin 13b with the pivot 13a of the lower door 13 as the center of swing. The mechanism is further structured in such a way that, when closing, the opening is covered with the two doors, namely, the upper and lower doors, while at the same time holding the lower door 13 at the closed position by holding the upper door 14 at the closed position, whereas, when opening, the lower door 13 is nested behind the upper door 14. Consequently, the lower door 13 swings interlockingly with the swing of the upper door 14 and along the groove configuration of the sliding guide 14b, and the swing from closed to open and open to closed positions are regulated by the sliding guide 14b of the upper door 14.

Also, a predetermined length of the groove from one end of the sliding guide 14b is determined in the beginning of the swing from the closed position to the open position by an arc having a center at the pivot 14a with a radius equal to the distance at the closed state between the center of the pivot 14a of the upper door and the sliding pin 13b (the distance R in FIG. 3) so that the lower door 13 will not swing. In this way, when the doors are opened, the upper door 14 can be swung first to permit the lower door 13 to easily nest inside the upper door 14 without colliding with the upper door 14 as shown by the transition from FIG. 3 to FIG. 4. When the doors are first opened from the closed state in FIG. 3, the upper door 14 swings but the lower door 13 does not swing until the state shown in FIG. 4 is reached because the sliding pin 13b of the lower door 13 is engaged in the above-described arc section of a predetermined length of the sliding guide 14b. As is clear from FIG. 4, as the lower door 13 does not swing during the state shown in FIG. 3 to the state shown in FIG. 4, the lower door 13 becomes nested inside the upper door 14. As the upper door 14 is further opened from the state of FIG. 4, the sliding pin 13b is led by the sliding guide 14b thereby causing the lower door 13 to swing interlockingly with the upper door 14.

The operation of the door opening and closing mechanism of the present invention will now be explained.

Figure 2:
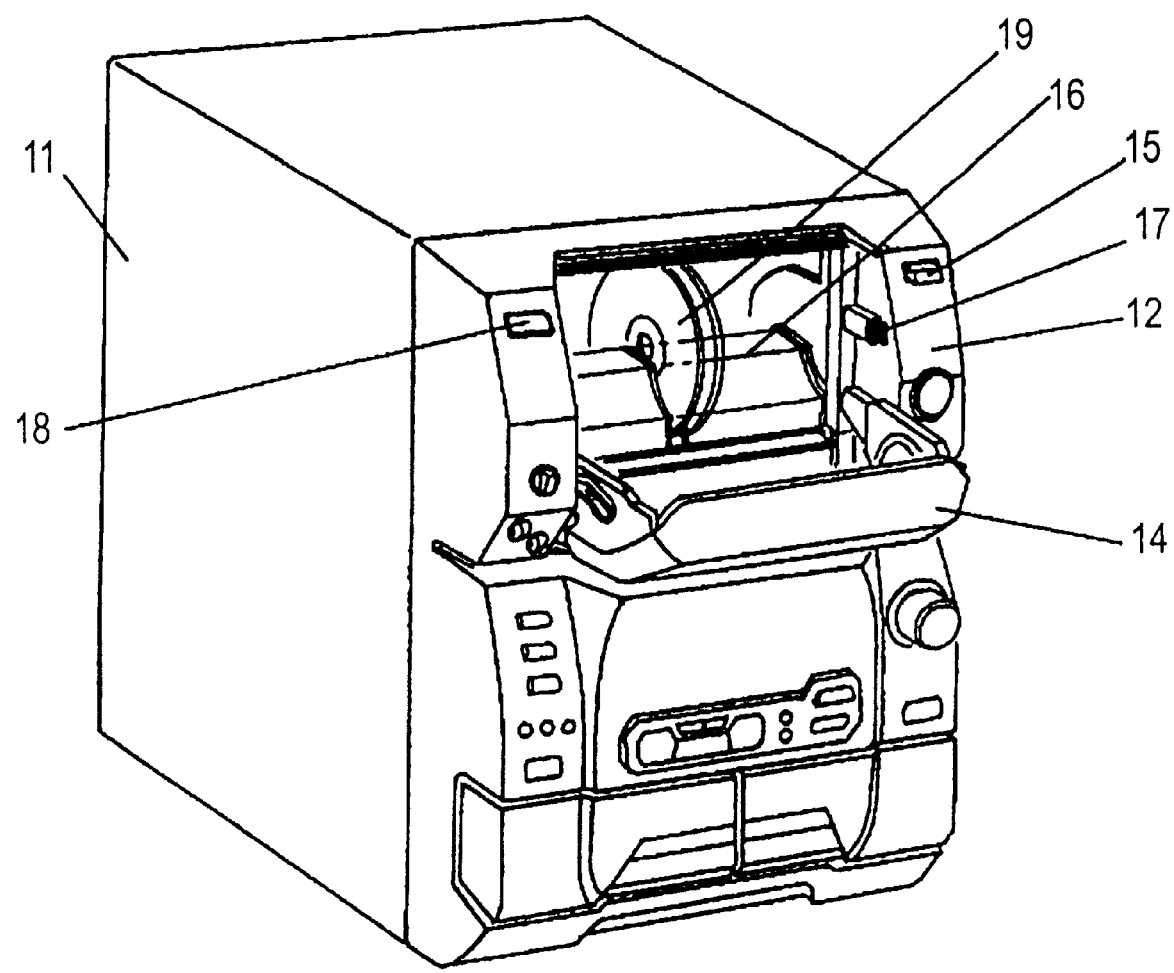
FIG. 2 is a perspective view of the audio equipment with the doors open.
Figure 3:
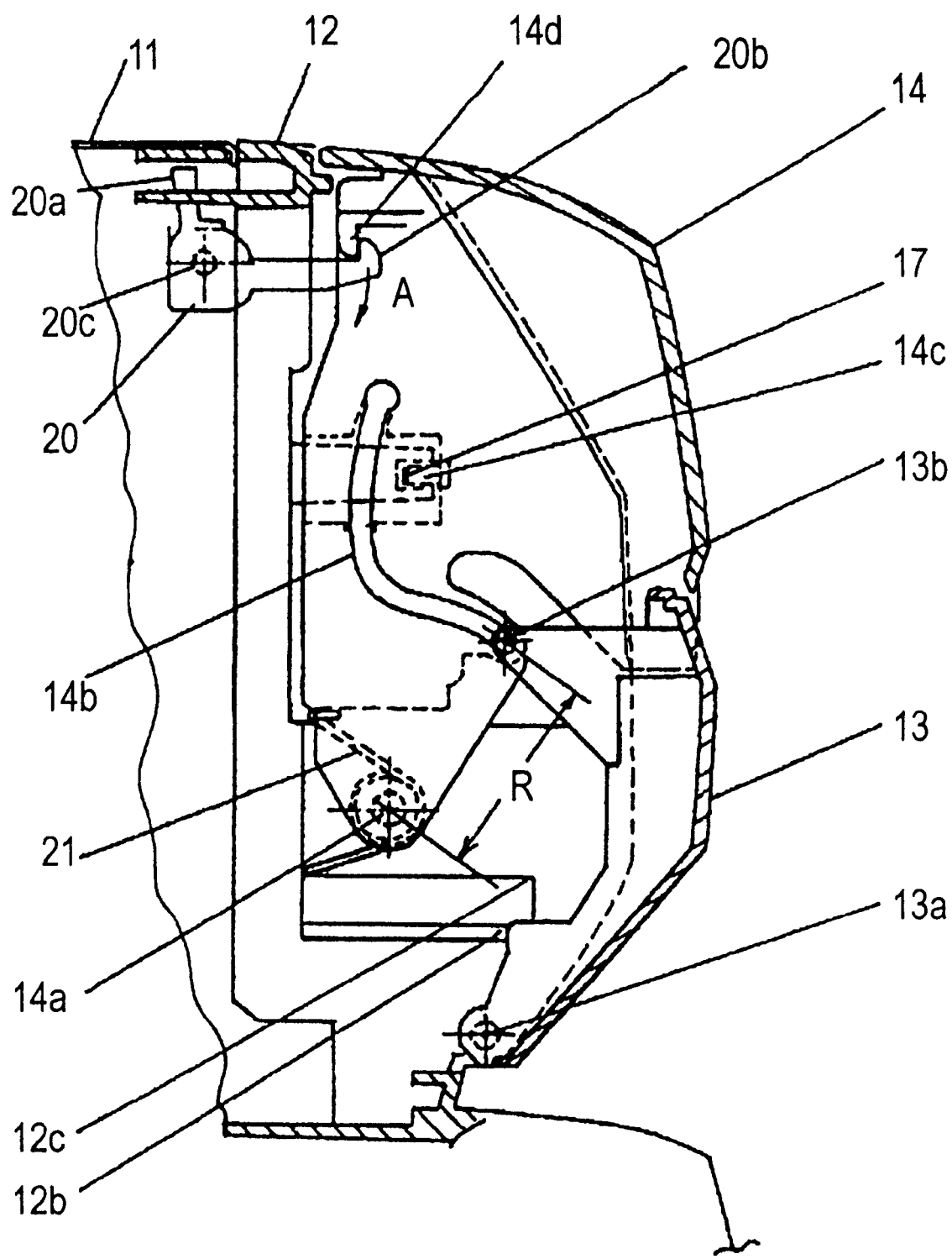
FIG. 3 is a side cross sectional view of a part of the door opening and closing mechanism with the doors closed.
Figure 4:
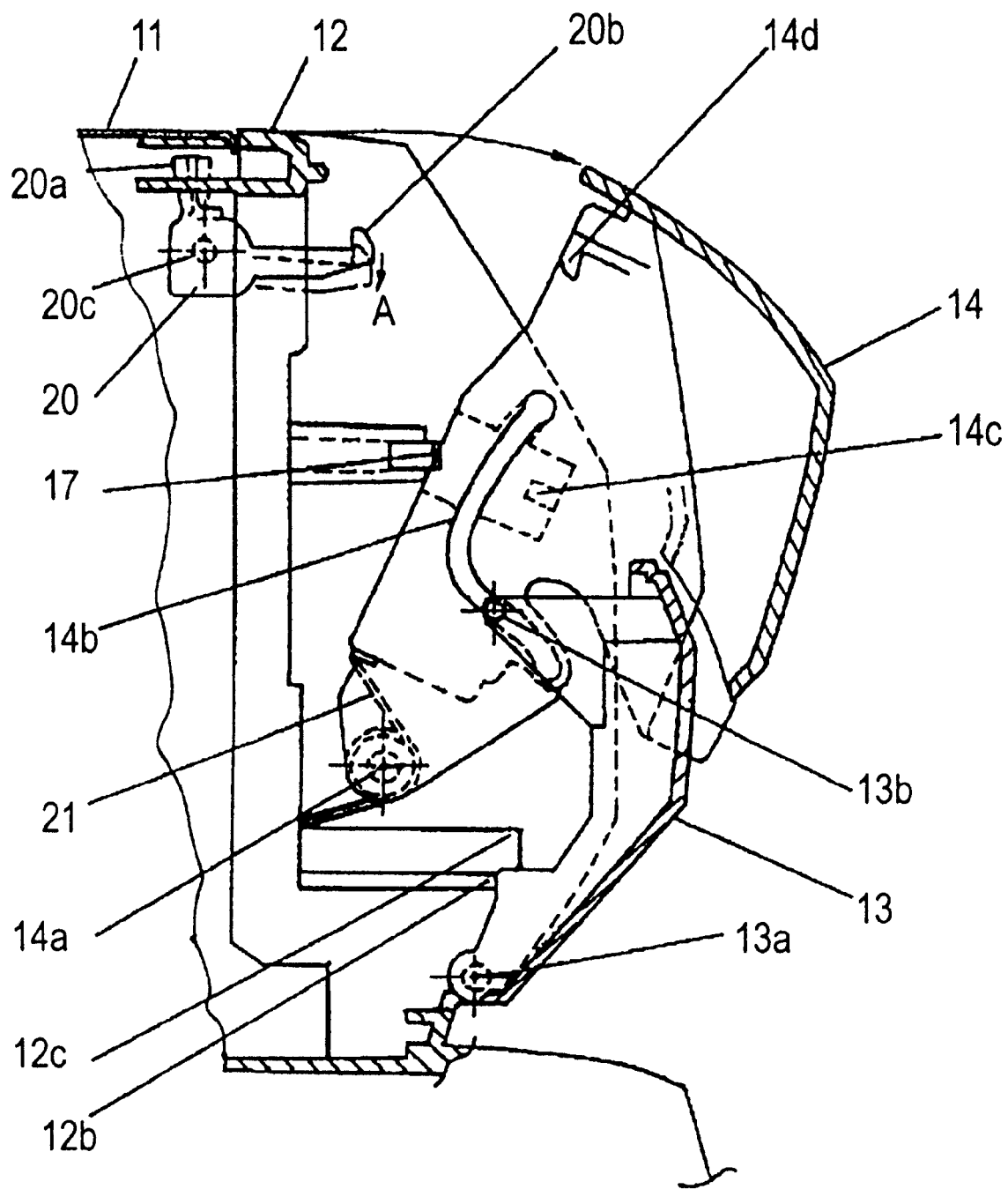
FIG. 4 is a side cross sectional view of a part of the door opening and closing mechanism while the doors are being opened.
Figure 5:
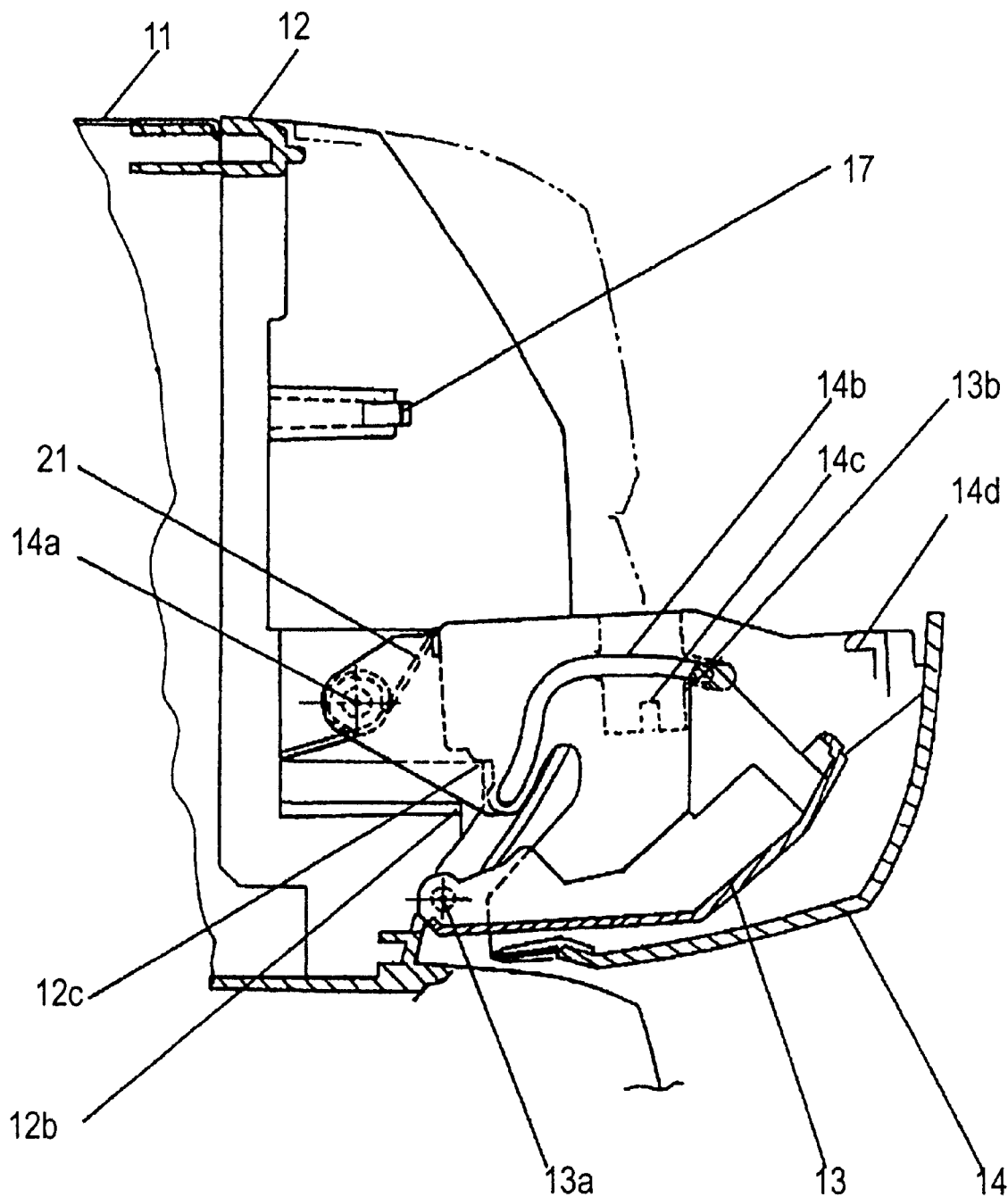
FIG. 5 is a side cross sectional view of a part of the door opening and closing mechanism with the doors open.
Figure 6:
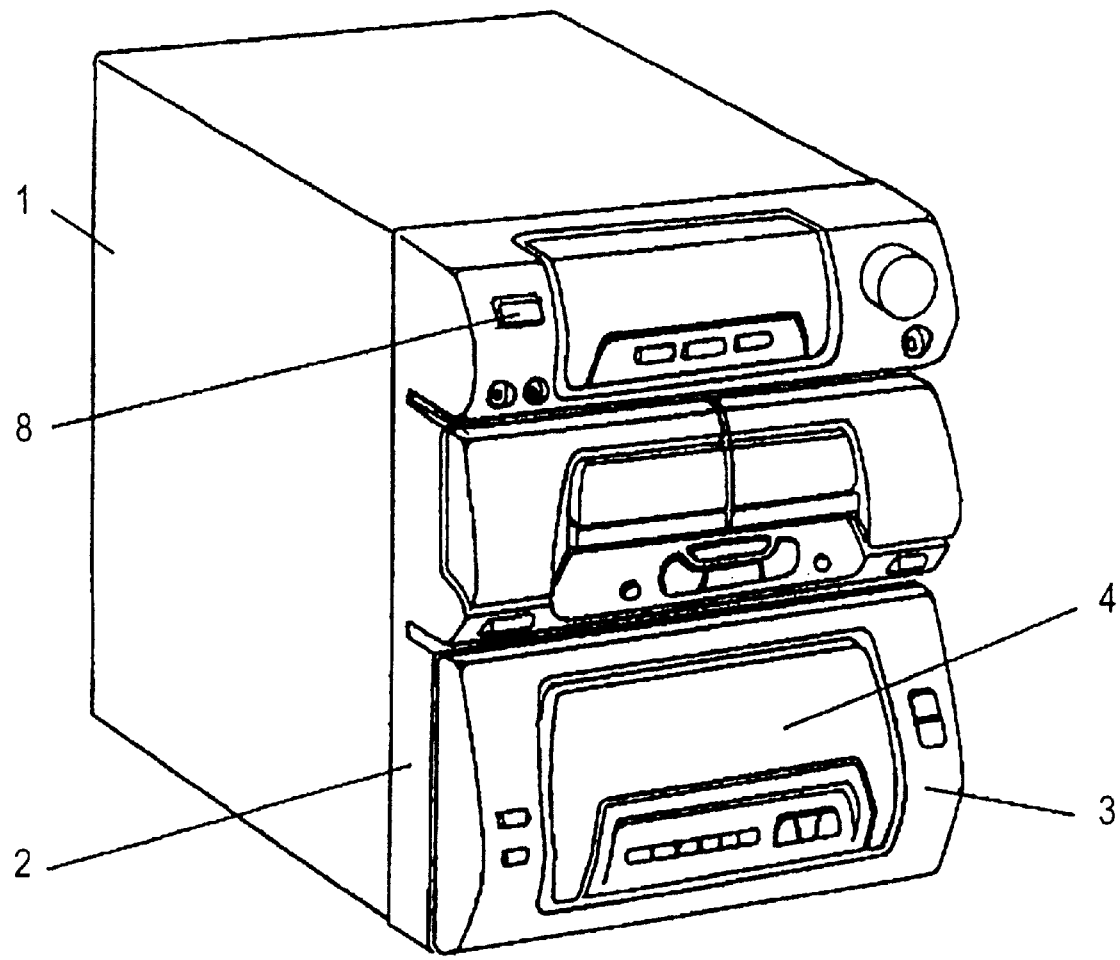
FIG. 6 is a perspective view of audio equipment having a built-in disc playing apparatus with the doors closed in an embodiment of a conventional door opening and closing mechanism.
Figure 7:
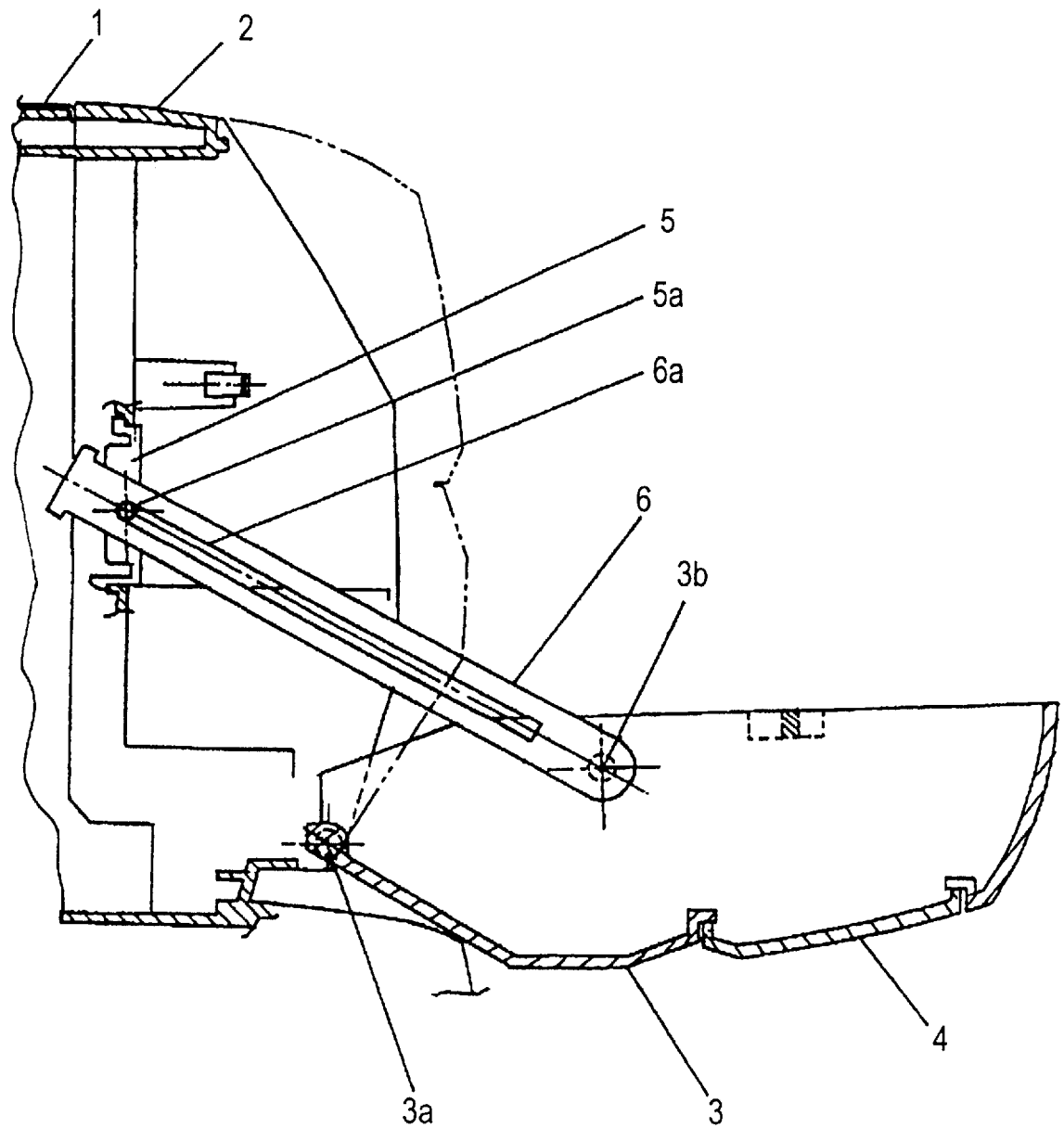
FIG. 7 is a side cross sectional view of a part of the audio equipment in FIG. 6 with the doors open.

To store, load or unload a disc, it is necessary to operate the mechanism from the closed state shown in FIG. 1 and FIG. 3 to the open state shown in FIG. 2 and FIG. 5. Upon pushing a door opening button 15, the motion is linked to the acting section 20a of the door hook 20 which keeps the door closed as shown in FIG. 3 causing the door hook 20 to rotate in the direction of the arrow A around the pivot 20c thus disengaging the hooking section 20b from the door hook 14d of the upper door 14 and causing it to open by the force of an unwinding spring 21 around the pivot 14a. Then the sliding pin 13b of the lower door 13 which is engaged with the sliding guide 14b provided on the side of the upper door 14 slidingly travels in the groove of the sliding guide 14b. Interlocking with the opening swing of the upper door 14, the curve of the groove of the sliding guide 14b guides the sliding pin 13b of the lower door 13, and as the upper door 14 opens, the lower door 13 becomes nested behind the upper door 14. The two doors are thus opened one on top of the other. And passing through the afore-described state shown in FIG. 4, the upper door 14 hits the opening stop 12c provided on the front panel 12 as shown in FIG. 2 and FIG. 5, thus completing the door opening motion.

When changing from this open state to a closed state, by moving the upper door 14 in the state of FIG. 5 toward a closing direction, the lower door 13 is caused to swing by the guidance of the sliding guide 14b which is engaged with the sliding pin 13b, and, passing through the state shown in FIG. 4, the upper door 14 and the lower door 13 are closed as shown in FIG. 3, thereby covering the disc unit.

In the above description, force of an unwinding spring 21 and manual force were used as the driving force for opening and closing the upper door 14 and the lower door 13 of the disc unit door. However, it goes without saying that one can employ a structure in which door opening and closing is electrically driven by using, for example, a motor, belts and gears.

As explained above, in the present invention, the door provided on the opening in the front of the disc unit of an audio device comprises upper and lower doors, the upper and lower doors have different pivots, the upper door is provided with a sliding guide which shifts with the swing of the upper door, the lower door is provided with a sliding pin which slides in engagement with the sliding guide depending on its shift, the sliding guide being so designed to guide the swinging of the sliding pin with the pivot of the lower door as the center of swing so that the lower door will swing interlockingly with the swing of the upper door, and when closing the doors, the lower door is held by holding the upper door while the opening is covered with the upper and lower doors, and when opening the doors, the lower door becomes nested inside the upper door. Consequently the amount of door projection from the front panel when the doors are open is only that projection due to the upper door, thereby minimizing the overall projection and eliminating the need for excessive free space in front of the disc unit. Furthermore, since overall door projection is small when open, it is not necessary to employ additional components to obtain sufficient strength to hold the doors open. It is therefore possible to hold the lower door by holding only the upper door when closed, thus providing a marked improvement over conventional door mechanisms.

Also, by employing a structure in which swings toward the opening direction and swings toward the closing direction are both regulated by a sliding guide of the upper door, the doors are held during opening and closing by only the upper door thereby making it unnecessary to use additional components.

What is claimed is:

1. A door opening and closing mechanism, comprising, an upper door and a lower door, said doors opening and closing by swinging, two pivots to rotatably support said upper and lower doors, a sliding guide in the form of an elongated groove provided on a side of said upper door, and a sliding pin provided on a side of said lower door in slidable engagement with said sliding guide, said sliding guide having a configuration such that said lower door opens and closes interlockingly with an opening and closing motion of said upper door, wherein an opening is interconnectedly covered by the two doors while said lower door is held in a closed position by holding said upper door in a closed position and said lower door is at least partially nested inside said upper door when said upper and lower doors are in an open position.

2. The door opening and closing mechanism of claim 1, wherein swinging of said lower door toward said open position when said upper door is in said closed position and toward said closed position when said upper door is in said open position are respectively regulated by said sliding guide.

3. The door opening and closing mechanism of claim 1, wherein a segment of said sliding guide is equal in length to an arc having its center at the pivot of said upper door and a constant radius equal to the distance between the center and said sliding pin in said closed position, whereby said lower door begins to swing only after said upper door begins to swing.

* * * * *